Oct. 6, 1942.        M. M. PINO        2,297,914
PIE PAN
Filed July 15, 1941
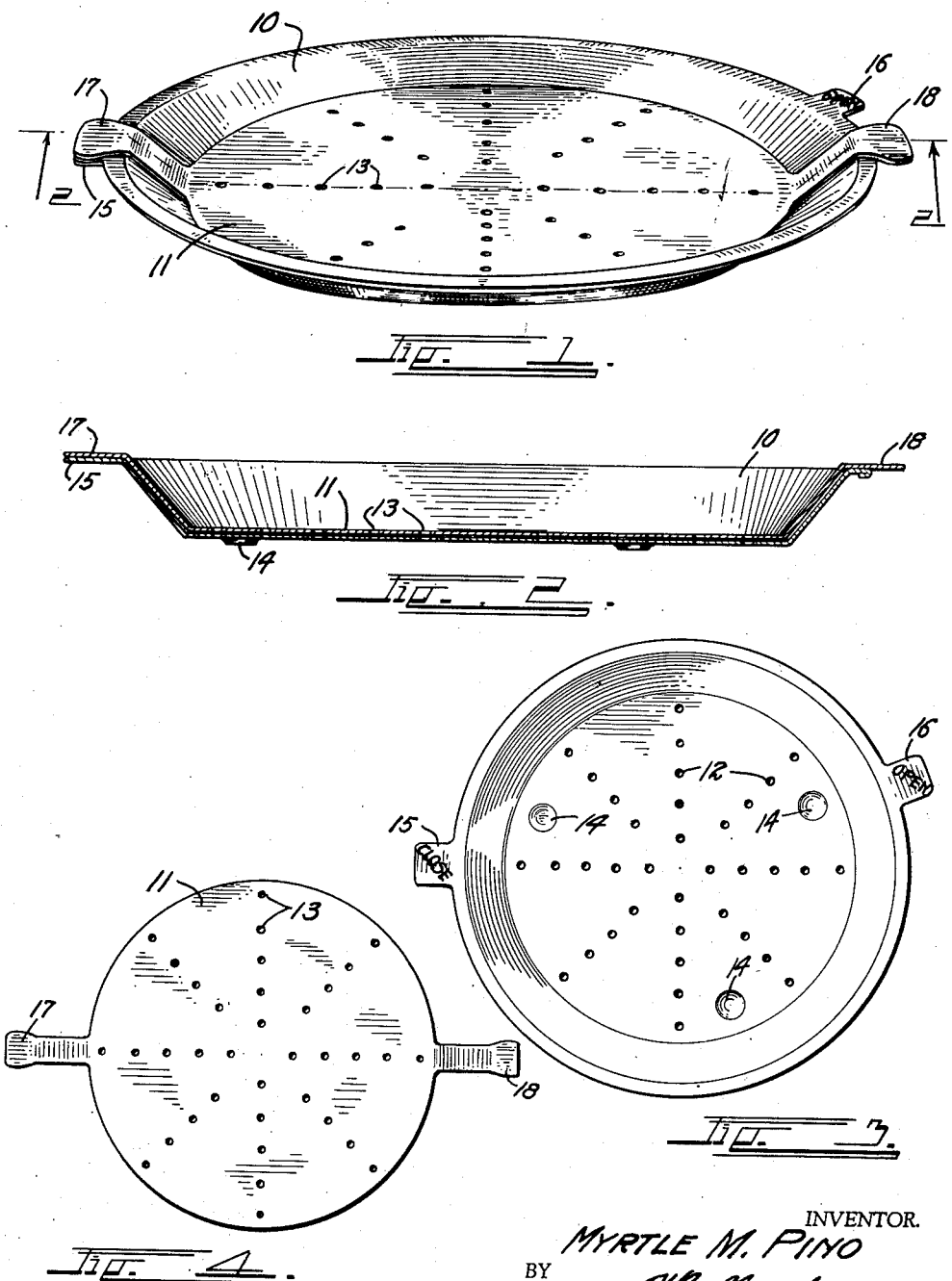
INVENTOR.
MYRTLE M. PINO
BY
ATTORNEY.

Patented Oct. 6, 1942

2,297,914

UNITED STATES PATENT OFFICE 2,297,914

PIE PAN

Myrtle M. Pino, Denver, Colo.

Application July 15, 1941, Serial No. 402,454

4 Claims. (Cl. 53—6)

This invention relates to a pan for baking pies.

If a pie is taken from the oven and allowed to stand in the pan until cool, the vapor in the crust will condense causing the crust to become damp and soggy. This is known as "sweating." To prevent this, pies must be removed from the original pan and placed in paper pans to allow the vapor to escape before condensing in or on the crust.

The principal object of this invention is to provide a pie pan which can be used similarly to the ordinary pans for baking purposes and which, when the pie is removed from the oven, will allow free escape of the moisture through the bottom of the pan so that the pies will not "sweat" and the crust will remain crisp and dry.

Another object of the invention is to provide a pie pan of this character from which any type of pie can be quickly and easily removed from the pan without breaking or spilling the pie.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of the improved non-sweating pie pan;

Fig. 2 is a cross section therethrough, taken on the line 2—2, Fig. 1;

Fig. 3 is a top view, on a smaller scale, of the pan with the insert plate removed; and Fig. 4 is a top view of the insert plate employed with the improved pan.

The invention comprises a pan 10, which may be of any size, outline, or depth, but which is preferably similar to a standard pie pan. An insert plate 11 rests on the bottom of the pan 10. The plate 11 is of a size to completely cover the pan bottom.

The bottom of the pan 10 is formed with a plurality of perforations 12, preferably but not necessarily, arranged on spaced-apart, radial lines, as shown in Fig. 3. The insert plate 11 is similarly provided with a corresponding series of perforations 13 arranged to align with the perforations 12 of the pan when the insert plate is turned to a predetermined position. This position can be located, even though a pie is in place in the pan, by means of ears 15 and 16 formed on the pan 10 and arms 17 and 18 formed on the insert plate 11. The arms 17 and 18 are of a length and size to lie over the ears 15 and 16 at certain relative positions of the insert and pan.

It is preferred to place the arms 17 and 18 exactly opposite each other and to place the ears 15 and 16 out of alignment with each other so that when the arm 18 is covering the ear 16 the perforations 13 will be out of alignment with the perforations 12. This will expose the word "Close" which appears on the ear 15.

When the arm 17 is in alignment with the ear 15, the perforations 13 will be aligned with the perforations 12. This will expose the word "Open" on the ear 16.

The bottom of the pan 10 is indented downwardly, preferably at three spaced-apart points, as shown at 14, in Fig. 3, to support the pan bottom above any surface upon which the pan may be resting.

Operation

The baker aligns the arm 18 and the ear 16 to close the perforations 12. He then places his crust and filling in the pan in the usual way. After the pie is baked and removed from the oven the baker rotates the insert plate 13 to align the arm 17 with the ear 15 and then sets the pan aside to cool. Steam and vapor escaping from the bottom of the pie, passes through the aligned perforations 13 and 12 and beneath the raised bottom of the pan, due to the indentations 14, so that the crust will remain crisp and dry.

When it is desired to remove the pie from the pan, it is only necessary to lift upwardly on the arms 17 and 18 and the pie will be lifted on the insert plate from whence it can be easily slid to the receiving dish or receptacle.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A non-sweating pie pan comprising: a pan-like receptacle having a series of perforations in its bottom; a disc resting in and covering the bottom of said pan, said disc having a similar series of perforations positioned to be brought into alignment with the perforations in the pan by rotation of said disc; and means for rotating said disc in said pan.

2. A non-sweating pie pan comprising: a pan-like receptacle having a series of perforations in its bottom; a disc resting in and covering the bottom of said pan, said disc having a similar series of perforations positioned to be brought into alignment with the perforations in the pan by rotation of said disc; an arm projecting outwardly from said disc by means of which it may be rotated in said pan; and means on said pan cooperating with said arm to designate the relative position of the two sets of perforations.

3. A non-sweating pie pan comprising: a pan-like receptacle having a series of perforations in its bottom; a disc resting in and covering the bottom of said pan, said disc having a similar series of perforations positioned to align with the perforations in the pan by rotation of said disc; arms projecting oppositely outward from said disc and extending upwardly and outwardly from the bottom of said pan; a first means on the pan to align with one of the arms when the perforations are in alignment; and a second means on the pan to align with the other arm when the perforations are out of alignment.

4. A non-sweating pie pan comprising: a pan-like receptacle having a series of perforations in its bottom; a disc resting in and covering the bottom of said pan, said disc having a similar series of perforations positioned to be brought into alignment with the perforations in the pan by rotating said disc in said pan; and means projecting downwardly from the bottom of the pan to support the latter above a supporting surface.

MYRTLE M. PINO.